(12) United States Patent
Stites et al.

(10) Patent No.: US 10,858,592 B2
(45) Date of Patent: Dec. 8, 2020

(54) METHODS AND SYSTEMS FOR RETORTING OIL SHALE AND UPGRADING THE HYDROCARBONS OBTAINED THEREFROM

(71) Applicant: Dragon Shale, LLC, Cedar City, UT (US)

(72) Inventors: Ronald C. Stites, Brighton, CO (US); Otto John Schneider, Mill Valley, CA (US)

(*) Notice: Subject to any disclaimer, the term of this patent is extended or adjusted under 35 U.S.C. 154(b) by 427 days.

(21) Appl. No.: 16/001,272

(22) Filed: Jun. 6, 2018

(65) Prior Publication Data

US 2018/0355254 A1 Dec. 13, 2018

Related U.S. Application Data

(60) Provisional application No. 62/516,189, filed on Jun. 7, 2017.

(51) Int. Cl.
  *C10B 53/06* (2006.01)
  *C10G 67/02* (2006.01)
  (Continued)

(52) U.S. Cl.
  CPC ............... *C10B 53/06* (2013.01); *B01D 1/28* (2013.01); *B01D 1/2846* (2013.01); *B01D 3/007* (2013.01); *B01D 3/009* (2013.01); *B01D 3/10* (2013.01); *B01D 3/143* (2013.01); *C10B 49/06* (2013.01); *C10G 7/06* (2013.01); *C10G 67/02* (2013.01); *B01D 2256/24* (2013.01);
  (Continued)

(58) Field of Classification Search
  CPC ........... C10B 53/06; C10B 49/06; B01D 1/28; B01D 1/2846; B01D 3/143; B01D 3/009; B01D 3/007; B01D 3/10; B01D 2256/24; B01D 2257/7022; B01D 2257/40; C10G 67/02; C10G 7/06; C10G 2300/1085; C10G 2300/207; Y02P 20/133
  See application file for complete search history.

(56) References Cited

U.S. PATENT DOCUMENTS 2,586,703 A * 2/1952 Odell ..................... C10B 53/06
  201/16
4,412,910 A * 11/1983 Archer ..................... C10J 3/66
  208/409
4,464,247 A 8/1984 Thacker

* cited by examiner

*Primary Examiner* — Randy Boyer
*Assistant Examiner* — Juan C Valencia
(74) *Attorney, Agent, or Firm* — O'Connor & Company; Ryan P. O'Connor

(57) ABSTRACT

Optimized, heat-integrated methods and systems are provided to produce multiple, high-value products from oil shale, while minimizing overall energy and water usage. A method for producing multiple products from oil shale comprises: feeding raw oil shale into a heated retorting unit, to convert kerogen into a retorted stream; introducing the retorted stream to a distillation column to generate a high-cetane diesel stream, an α-olefin-containing chemical stream, an asphalt/asphalt additive stream, and an overhead gas stream, wherein heat contained in the retorted stream is harnessed as distillation energy; separating the overhead gas stream into a fuel gas stream and a purge gas stream; combusting the fuel gas stream to generate hot flue gas; heating the purge gas with hot flue gas; feeding the heated purge gas directly to the heated retorting unit; and recovering the high-cetane diesel stream, the α-olefin-containing chemical stream, and the asphalt/asphalt additive stream as products.

27 Claims, 3 Drawing Sheets

(51) Int. Cl.
  *C10G 7/06* (2006.01)
  *B01D 3/10* (2006.01)
  *C10B 49/06* (2006.01)
  *B01D 1/28* (2006.01)
  *B01D 3/14* (2006.01)
  *B01D 3/00* (2006.01)
(52) U.S. Cl.
  CPC .. *B01D 2257/40* (2013.01); *B01D 2257/7022* (2013.01); *C10G 2300/1085* (2013.01); *C10G 2300/207* (2013.01)

METHODS AND SYSTEMS FOR RETORTING OIL SHALE AND UPGRADING THE HYDROCARBONS OBTAINED THEREFROM

PRIORITY DATA

This patent application is a non-provisional application claiming priority to U.S. Provisional Patent App. No. 62/516,189, filed on Jun. 7, 2017, which is hereby incorporated by reference herein.

FIELD OF THE INVENTION

The present invention generally relates to the field of retorting oil from oil shale (kerogen-containing rock) and upgrading the value of the produced oil by using the waste heat of retorting to separate the oil into higher-value product fractions.

BACKGROUND OF THE INVENTION

The vast amounts of kerogen-containing rock (called "oil shale") have long been known. Some estimates of the potential amount of usable oil from oil shale have been in the multiple trillions of barrels. Attempts to exploit those vast reserves as a commodity fuel go back to the late 1800s. Whenever the price of crude oil increased, interest in oil shale increased; but as soon as the price of crude oil stabilized, that interest waned. Regardless of the absolute price of crude oil, it has always seemed that an oil shale industry was "just around the corner." That industry would arrive if only crude oil prices were to rise just a bit more.

The understanding of oil shale as a precursor to a product goes awry from the very start—its name. Western U.S. oil shale (also called "Green River Formation oil shale") is neither oil nor shale. Oil shale contains no liquid oil whatsoever. Oil shale contains a solid organic material called kerogen. Kerogen is made up of long-chain macromolecules that are left over from decomposition of marine algae. Those macromolecules will not even dissolve in most organic solvents. Kerogen becomes a liquid oil only after adding energy, usually as heat in a process generally called "retorting," to break many of those long-chain macromolecules. Hence, it takes energy to turn the kerogen into usable oil.

FIG. 1 shows the structure of several types of kerogen. Kerogen is composed of aliphatic and aromatic biopolymers, the proportions of which determine the kerogen type. Type I kerogen contains mainly long aliphatic chains. Type II kerogen contains mainly medium-length aliphatic chains. Type III kerogen contains short chains and many aromatic rings. Note that in any of these kerogen molecules, one or more oxygen atoms may be replaced with sulfur or nitrogen heteroatoms. Type II kerogen in FIG. 1 explicitly indicates several S and N substitutions, for illustration only (Type I and Type III kerogen may also contain S and N substitutions).

Green River formation oil shale, and similar oil shales, contain Type I kerogen (see FIG. 1). With heat, Type I kerogen tends to fracture near the ends of the long chains, making long-chain alkanes, α-olefins, and complex ring structures that contain much of the sulfur and nitrogen heteroatoms of the kerogen. Compared to Type II and III kerogen, Type I kerogen makes more liquid oil, more and/or longer strait-chain alkanes, more and/or longer-chain α-olefins, fewer aromatics, and less gas (methane, ethane, etc.). Type I kerogen also makes a significant amount cyclic, heteroatom-containing macromolecules similar to asphaltenes. This mix of compounds is a source of potential, high-value final products.

Classical, ex situ retorting is the most cost-effective, proven way to free synthetic crude oil (SCO) from the oil shale. Various schemes can be used including, but not limited to, methods such as "Paraho" or "ATP" (Alberta Taciuk Process). These retorting schemes can be accomplished by direct combustion of residual carbon on the spent shale or by indirect heating of the shale. The heat required for freeing the SCO from the rock can be provided by natural gas or electricity.

Existing ex situ technologies generally cool the hot gases from the retort as quickly as possible to try to trap as much oil as possible. This is done at great cost in energy, sometimes requiring refrigeration. There has been little attempt to separate out various fractions from the oil. There are a number of reasons for this. Some oil shale strategies focus on fuel value alone and only consider burning the SCO to generate electrical power. Others consider the SCO only from the perspective of a feedstock to a refinery.

Excessive temperatures and long in-bed residence time can fracture and convert otherwise useful products into smaller, more volatile compounds and more aromatics. This has often been the goal of many retorting approaches that were focused on commodity fuels such as gasoline and diesel fuel.

Oxygen in the process stream can convert the products into reactive compounds that can polymerize and cause downstream refining problems and additional costs. Oxygen can also create volatile arsenic oxides that spread throughout the SCO boiling range. Arsenic is a strong catalytic poison that increases the cost of refining the SCO and any separated products.

Historical approaches to oil shale development have focused on the production of an undifferentiated SCO from oil shale. The goal was to produce lighter commodity transportation fuels by feeding this poor-quality crude to a refinery. The SCO would have to be sold at a substantial discount compared to crude oil, because of its low value to a refinery. The discount price was added to an "energy penalty" compared to crude oil. The heat required to crack the kerogen into free-flowing product was an additional cost compared to most sources of even heavy crude oil. In the case of naturally occurring oil and gas, the heat required to crack the organic material has been already supplied by serendipitous geothermal processes over millennia. This tended to put kerogen oil at an energy disadvantage to naturally occurring oil and gas. Hence, as the price of crude oil goes up, so does the price of energy (heat) and therefore the cost of kerogen oil production. When added to the discount for SCO quality, the oil shale industry remained stalled, regardless of the absolute price of crude oil.

Historical approaches have tried to overcome these fundamental issues by hypothesizing larger and larger projects. The intent was to make up the energy and financial penalties via large product volumes and highly complex plants. One added complexity often included was hydrotreating the SCO. This requires large amounts of water to produce hydrogen for the upgrader. The idea was to treat the SCO to avoid or at least mitigate the discount price of SCO compared to crude oil. Hence, many projects were multiple billions of dollars in cost, required huge mining operations in ecologically sensitive areas, taxed limited transportation and energy infrastructures in under-developed areas, and consumed large amounts of water in arid lands. The risks and rewards never seemed to work.

What are needed are optimized methods and systems to produce multiple, higher-value products from oil shale, while minimizing energy and water usage.

SUMMARY OF THE INVENTION

The present invention addresses the aforementioned needs in the art, as will now be summarized and then further described in detail below.

Some variations of the invention provide a method for producing multiple products from oil shale, the method comprising:

(a) providing raw oil shale containing kerogen;

(b) feeding the raw oil shale into a heated retorting unit, wherein the heated retorting unit converts the kerogen into a retorted stream comprising vaporized synthetic crude oil;

(c) introducing the retorted stream to a distillation column to generate at least a high-cetane diesel stream, an α-olefin-containing chemical stream, an asphalt/asphalt-additive stream, and an overhead gas stream, wherein heat contained in the retorted stream is harnessed as distillation energy in the distillation column;

(d) separating the overhead gas stream into a fuel gas stream and a purge gas stream;

(e) combusting at least a portion of the fuel gas stream to generate a hot flue gas;

(f) heating the purge gas with the hot flue gas, to generate heated purge gas;

(g) feeding the heated purge gas directly to the heated retorting unit; and (h) recovering the high-cetane diesel stream, the α-olefin-containing chemical stream, and the asphalt/asphalt additive stream as products.

In some embodiments, the raw oil shale is Green River Formation oil shale.

In preferred embodiments, the heated retorting zone of the retorting unit is operated below an average retorting temperature of 500° C.

The method may further include heat integration of the hot flue gas with the heated retorting unit separately from heat integration arising from step (g). The hot flue gas should not be introduced directly into a feed stream of the heated retorting unit. In some embodiments, the heated flue gas indirectly heats the raw oil shale prior to, or as part of, step (b). In these or other embodiments, the heated flue gas indirectly heats the heated retorting unit. The hot flue gas may also be used to indirectly supply heat or energy to the distillation system and other product purification systems.

In some embodiments, the method further comprises combusting spent shale from the heated retorting unit, to generate fired spent shale and a portion of the hot flue gas used to heat purge gas, heat the retort, or supply heat to distillation or other product purification processes.

Optionally, renewable heat may be used, at least in part, to generate the heated purge gas. In some embodiments, the renewable heat is obtained from solar energy, wind energy, biomass energy, geothermal energy, or a combination thereof.

The heated purge gas may be at a temperature of about 400° C. or greater, such as about 500° C. or greater.

The heated purge gas preferably contains less than 0.1 vol % oxygen, and more preferably less than 0.01 vol % oxygen.

The heated purge gas preferably contains at least 25 vol % carbon dioxide, and more preferably at least 50 vol % carbon dioxide. The retorted stream entering the distillation unit also preferably contains at least 25 vol % carbon dioxide, and more preferably at least 50 vol % carbon dioxide.

In some methods, a hot cyclone and/or ceramic filter is disposed upstream of the distillation column, to remove solid particulates (e.g., dust) from the retorted stream.

In some embodiments, the method further comprises generating a purified wax stream from the distillation column in step (c).

In some embodiments, the method further comprises generating one or more nitrogen-containing streams comprising pyridines, pyrroles, acridines, amines, and/or similar compounds (i.e., functional analogues of pyridines, pyrroles, acridines, or amines) from the distillation column in step (c).

In certain variations, the invention provides a method for producing multiple products from oil shale, the method comprising:

(a) providing raw oil shale containing kerogen;

(b) feeding the raw oil shale into a heated retorting unit, wherein the heated retorting unit converts the kerogen into a retorted stream comprising vaporized synthetic crude oil;

(c) introducing the retorted stream to a distillation column to generate at least a high-cetane diesel stream, an α-olefin-containing chemical stream, an asphalt/asphalt additive stream, and a purge stream, wherein heat contained in the retorted stream is harnessed as distillation energy in the distillation column;

(d) heating at least a portion of the purge stream with renewable heat (e.g., heat derived from solar energy, wind energy, biomass energy, and/or geothermal energy), to generate heated purge gas;

(e) feeding the heated purge gas directly to the heated retorting unit; and (f) recovering the high-cetane diesel stream, the α-olefin-containing chemical stream, and the asphalt/asphalt additive stream as products.

Other variations of the invention provide a system for producing multiple products from oil shale, the system comprising:

(a) a heated retorting unit configured to convert kerogen-containing raw oil shale into a retorted stream comprising vaporized synthetic crude oil;

(b) a distillation column in flow communication with the heated retorting unit, wherein the distillation column comprises a high-cetane diesel outlet, an α-olefin chemical outlet, an asphalt outlet, and an overhead gas outlet;

(c) a gas separation unit in flow communication with the overhead gas outlet, wherein the gas separation unit is configured to separate an overhead gas stream into a fuel gas stream and a purge gas stream;

(d) a combustion unit in flow communication with the fuel gas stream, wherein the combustion unit is configured to combust the fuel gas stream to generate a hot flue gas, and wherein the combustion unit is further configured to heat the purge gas stream to generate heated purge gas; and (e) a gas flow line between the combustion unit and the heated retorting unit, wherein the gas flow line is configured to feed the heated purge gas to the heated retorting unit.

In some embodiments, the heated retorting unit is a vertical retort. In other embodiments, the heated retorting unit is a horizontal retort.

The combustion unit may be in flow communication with a solid outlet of the heated retorting unit, wherein the combustion unit is further configured to combust spent shale.

In some systems, a hot cyclone and/or ceramic filter is disposed between the heated retorting unit and the distillation column, to remove solid particulates (e.g., dust) from the retorted stream prior to entering the distillation column.

In some systems, the distillation column further comprises a purified wax outlet.

In some systems, the distillation column further comprises one or more outlets for pyridine, pyrroles, acridines, amines, and/or similar compounds.

The system may further include a thermal cracker in flow communication with the distillation column.

The system may further include a hydrogenation unit in flow communication with the distillation column.

The system may further include one or more chemical or physical adsorption units in flow communication with the distillation column.

DETAILED DESCRIPTION OF EMBODIMENTS OF THE INVENTION

Figure 1:
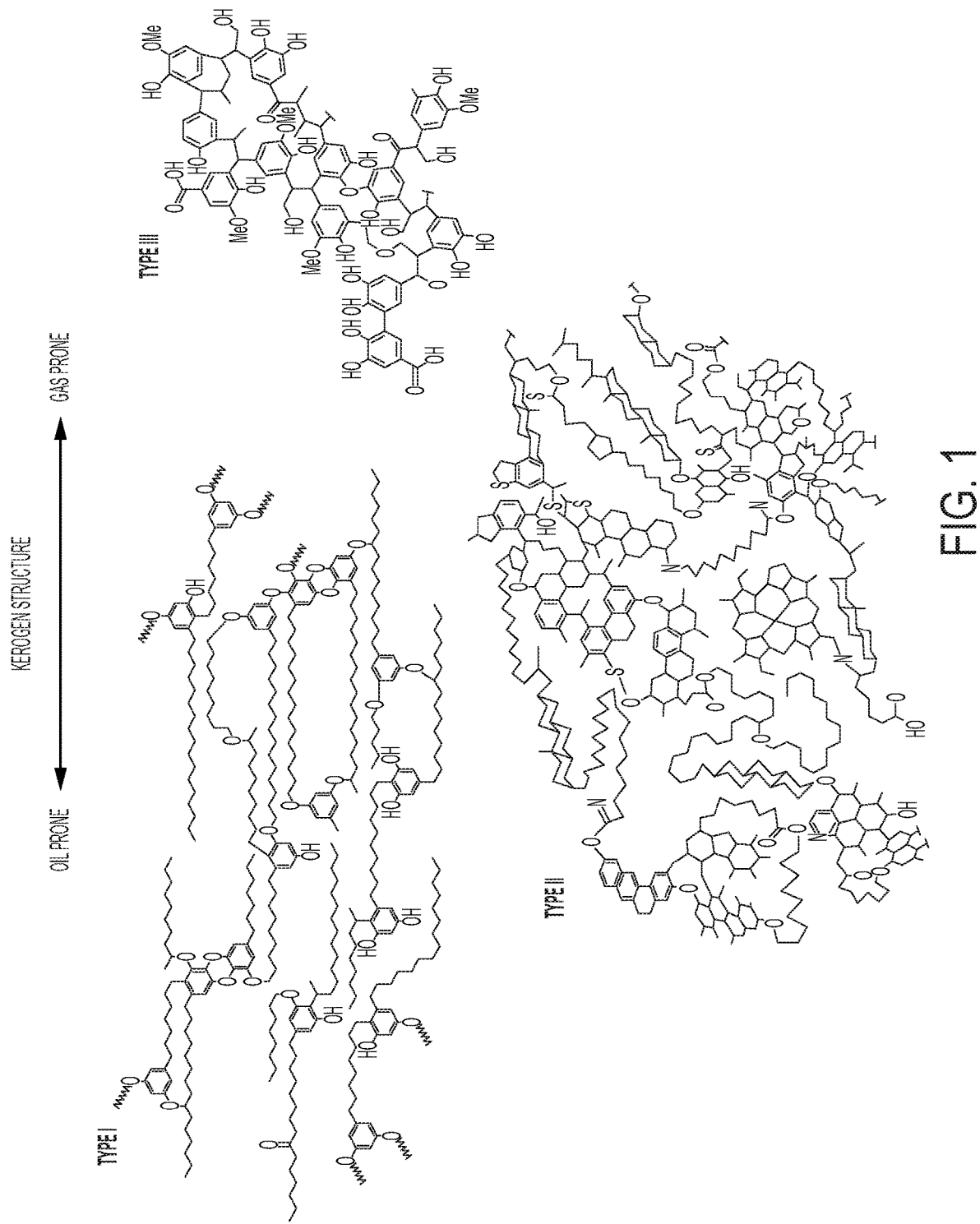
FIG. 1 is a diagram depicting the structure of several types of kerogen contained in oil shale.

The systems, methods, and compositions of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

This invention is predicated, at least in part, on harnessing residual heat used to crack kerogen into synthetic crude oil ("SCO"), in downstream distillation of the SCO, in order to produce higher-value products. In particular, an optimal retorting process produces and preserves high-value products while minimizing the production and spread of contaminants throughout the products, and integrates the steps at the kerogen oil production site so that the waste heat that is used to crack the kerogen into SCO is harnessed to add more value to products by separating them into salable fractions. This invention accomplishes these goals and makes practical siting and operating small plants at ideal sites in the Western United States, for example. These plants produce smaller quantities of high-value products while minimizing energy and water usage.

In some aspects, the present invention provides methods for producing high-value products from Green River oil shale, and oil shales of similar composition.

In some aspects, the present invention provides methods for integrating retorting and product separation technologies for oil shales and similar feedstocks.

In some aspects, the present invention provides methods for separating kerogen-derived SCO from oil shale retorting into more-valuable products using distillation technology integrated with the heat of retorting, fuel gas produced by retorting, and the spent shale from retorting.

In some aspects, the present invention provides methods for modifying the operating conditions of the retort to adjust the performance of the distillation process—including simulating vacuum distillations for purification of heavy components.

In some aspects, the present invention provides methods for judging the viability of various retorting methods to be potentially used for producing high-value products from Green River Formation oil shale and similar oil shales.

Some variations of the invention provide a method for producing multiple products from oil shale, the method comprising:

(a) providing raw oil shale containing kerogen;

(b) feeding the raw oil shale into a heated retorting unit, wherein the heated retorting unit converts the kerogen into a retorted stream comprising vaporized synthetic crude oil;

(c) introducing the retorted stream to a distillation column to generate at least a high-cetane diesel stream, an α-olefin-containing chemical stream, an asphalt/asphalt additive stream, and an overhead gas stream, wherein heat contained in the retorted stream is harnessed as distillation energy in the distillation column;

(d) separating the overhead gas stream into a fuel gas stream and a purge gas stream;

(e) combusting at least a portion of the fuel gas stream to generate a hot flue gas;

(f) heating the purge gas with the hot flue gas, to generate heated purge gas;

(g) feeding the heated purge gas directly to the heated retorting unit; and (h) recovering the high-cetane diesel stream, the α-olefin-containing chemical stream, and the asphalt/asphalt additive stream as products.

In some embodiments, the raw oil shale is (or includes) Green River Formation oil shale. In some embodiments, the raw oil shale is (or includes) an oil shale that is similar to Green River Formation oil shale, i.e., lacustrine-type lamosite in which a major organic constituent is lamalginite derived from lacustrine planktonic algae. Lamalginite is a structured organic matter (alginite) in sapropel, composed of thin-walled colonial or unicellular algae that occur as distinct laminae, interbedded with mineral matter.

The mineral part of Green River Formation oil shale and similar oil shales is actually not shale. It is primarily dolomite, a calcium/magnesium carbonate. Fortuitously, at approximately the same temperatures required to retort the kerogen, a portion of the dolomite begins to break down and yield calcium carbonate, magnesium oxide, and carbon dioxide. This increases the porosity of the rock and creates some carbon dioxide gas flow. This helps drive the oil out of the rock and into a flowing gas stream. This beneficial factor has made Green River Formation oil shale and similar oil shales some of the easiest and most efficient types of oil shale to retort.

However, the mineral part of Green River Formation oil shale and similar oil shales contains small amounts of skutterudites, which are arsenic-containing nickel and cobalt compounds. Although these compounds are fairly stable thermally, they are not stable at high temperature when oxygen is present. Volatile arsenic oxides form. These spread arsenic contamination to many, if not all, of the high-value product cuts. Arsenic is usually a powerful catalyst poison that is to be avoided in nearly all downstream hydrocarbon processing. Hence, product value is enhanced by keeping oxygen substantially out of a retorting process that is configured for producing multiple high-value final products.

Heat integration is an important aspect of this invention. The heated retorting unit is heat-integrated with the distillation column, allowing excess heat from retorting to be harnessed as distillation energy. The step of feeding the heated purge gas directly to the heated retorting unit provides direct heat integration between the purge gas, which was derived from the distillation column, to the retorting unit. The method may separately include heat integration of the hot flue gas with the heated retorting unit. The hot flue gas should not be introduced directly into a feed stream of the heated retorting unit. In some embodiments, the heated flue gas indirectly—i.e., indirect heat exchange without mixing of material) heats the raw oil shale prior to, or as part of, step (b). In these or other embodiments, the heated flue gas indirectly heats the heated retorting unit—i.e., indirect heat exchange without the heated flue gas entering the retorting unit itself.

In some embodiments, the method further comprises combusting spent shale from the heated retorting unit, to generate fired spent shale and a portion of the hot flue gas.

The heated retorting unit itself, in addition to providing excess heat as distillation energy to the distillation column, may function as a first stage, a partial stage, or an assisted stage of the distillation process. That is, sufficient energy may be imparted to the retorted stream such that upon entrance into the distillation column, the retorted stream immediately separates into a vapor that rises and a liquid that falls. The energy that was contained in the retorted stream is carried into both the liquid and vapor within the distillation column, useful for multiple stages within the column (not only the feed stage).

The purge gas temperature is preferably optimized to retort the oil shale quickly (which improves yield) while minimizing cracking. The heated purge gas may be at a temperature of about 400° C. or greater, such as about 500° C. or greater, up to about 650° C. In various embodiments, the heated purge gas is maintained at a temperature of about 400° C., 425° C., 450° C., 475° C., 500° C., 525° C., 550° C., 575° C., 600° C., 625° C., or 650° C. The optimal temperature of the heated purge gas, in some embodiments, depends on the composition of the purge gas and the flow rate of the purge gas through the retorting unit. Higher flow rates may necessitate higher purge gas temperatures due to heat-transfer limitations, for example. Higher $CO_2$ concentrations in the purge gas may enable lower purge gas temperatures due to the retorting effectiveness of $CO_2$, for example.

Optionally, renewable heat may be used, at least in part, to generate the heated purge gas. In some embodiments, the renewable heat is obtained from solar energy, wind energy, biomass energy, geothermal energy, or a combination thereof.

Note that the source of heat for retorting does not strictly need to include combustion of fuel gas recycled from the distillation column. Renewable heat may be utilized to heat the purge gas for retorting. Non-renewable energy may also be used to supplement combustion of fuel gas recycled from the distillation column and renewable energy.

Thus, in certain embodiments, the invention provides a method for producing multiple products from oil shale, the method comprising:

(a) providing raw oil shale containing kerogen;

(b) feeding the raw oil shale into a heated retorting unit, wherein the heated retorting unit converts the kerogen into a retorted stream comprising vaporized synthetic crude oil;

(c) introducing the retorted stream to a distillation column to generate at least a high-cetane diesel stream, a high α-olefin-containing chemical stream, an asphalt/asphalt additive stream, and a purge stream, wherein heat contained in the retorted stream is harnessed as distillation energy in the distillation column;

(d) heating at least a portion of the purge stream with renewable heat (e.g., heat derived from solar energy, wind energy, biomass energy, and/or geothermal energy), to generate heated purge gas;

(e) feeding the heated purge gas directly to the heated retorting unit; and (f) recovering the high-cetane diesel stream, the high α-olefin-containing chemical stream, and the asphalt/asphalt additive stream as products.

The heated purge gas preferably contains at least 25 vol % carbon dioxide, and more preferably at least 50 vol % carbon dioxide. In various embodiments, the heated purge gas contains at least about 20, 30, 40, 50, 60, 70, or 80 vol % carbon dioxide. Optionally, additional $CO_2$ is introduced into the heated purge gas, beyond $CO_2$ that is derived from retorting. For example, the flue gas may be cleaned of contaminants to generate cleaned $CO_2$, which may be introduced into the heated purge gas. Alternatively, or additionally, an external source of $CO_2$ may be used.

The presence of significant $CO_2$ in the purge gas is beneficial because $CO_2$ purging of hot oil shale generally improves recovery of oil (heavy components) over a static bed, $CO_2$ is generally inert for organic compounds, $CO_2$ has significant solubility in many organic compounds, $CO_2$ streams can carry significant amounts of heat, and $CO_2$ is a natural off gas from retorting which makes the $CO_2$ readily available (thereby reducing overall cost) compared to other heat carriers or retorting agents.

The retorted stream entering the distillation unit also preferably contains at least 25 vol % carbon dioxide, and more preferably at least 50 vol % carbon dioxide. In various embodiments, the retorted stream contains at least about 20, 30, 40, 50, 60, 70, or 80 vol % carbon dioxide. $CO_2$ is a product of retorting. Thus, even though other produced gases dilute the incoming $CO_2$ (in the heated purge gas), generated $CO_2$ may cause the $CO_2$ concentration in the retorted stream to be higher, lower, or about the same as the $CO_2$ concentration in the heated purge gas. Optionally, additional $CO_2$ is introduced into the retorted stream.

The presence of significant $CO_2$ in the retorted stream is beneficial because $CO_2$ is generally inert for organic compounds, $CO_2$ has significant solubility in many organic compounds, $CO_2$ streams can carry significant amounts of heat, and CO2 provides inert-gas dilution in the distillation column. Inert-gas dilution (specifically $CO_2$ dilution) reduces the partial pressures of hydrocarbons, thereby simulating vacuum distillation in which all partial pressures are low. Low partial pressure of hydrocarbon components is advantageous owing to their thermodynamic properties, leading to more efficient separation and formation of multiple products.

The heated purge gas, in addition to $CO_2$, may contain various gases such as CO, $CH_4$, $C_2H_2$, $C_2H_4$, $C_2H_6$, $H_2$, $H_2O$, $H_2S$, NO, $NO_2$, $N_2$, and others, including other light hydrocarbons that are contained in the overhead gas stream. Because a portion of the overhead gas stream is diverted as a fuel gas to make heat, the overhead gas stream and therefore the heated purge gas should contain CO and/or light hydrocarbons (e.g., $C_1$-$C_6$ hydrocarbons) to provide a heat (BTU) value to the stream.

The heated purge gas must contain less than 1 vol % oxygen, preferably less than 0.1 vol % oxygen, more preferably less than 0.01 vol % oxygen, and most preferably less than 0.001 vol % (10 ppm) oxygen. In various embodiments, the heated purge gas contains less than about 50, 40, 30, 20, 10, 5, 2, or 1 ppm $O_2$. In some embodiments, the heated purge gas contains essentially no oxygen, or no detectible oxygen. The absence or minimal level of oxygen is preferred to minimize loss of α-olefins and asphaltenes, to minimize the creation of highly reactive oxygenates, and to minimize generation of arsenic oxides in the process. The presence of even trace oxygen can cause generation of polymers in subsequent refinery upgrading steps. Generally, low or no oxygen minimizes arsenic contamination and improves product yields.

The retorted stream entering the distillation unit also must contain less than 1 vol % oxygen, preferably less than 0.1 vol % oxygen, more preferably less than 0.01 vol % oxygen, and most preferably less than 0.001 vol % (10 ppm) oxygen. In various embodiments, the retorted stream contains less than about 50, 40, 30, 20, 10, 5, 2, or 1 ppm $O_2$. In some embodiments, the retorted stream contains essentially no oxygen, or no detectible oxygen.

Purge gas velocity in the retorting unit is preferably high enough to carry the organic vapors quickly away from the hot shale, but not so high as to make heat transfer to the shale ineffective, over-dilute the product gas (lower partial pressures too much), or blow liquid up the distillation column to cause flooding. Oil shale bed dimensions and configurations will influence the purge gas velocity. Certain Green River Formation oil shales have enough bitumen or residual heavy oil to cause sticking and bridging in thick bed retorts. Sufficient purge gas velocity through or over a thin bed reduces the tendency to stick or bridge the retorting shale pile.

Purge gas velocity in the distillation column is preferably high enough to avoid or minimize column flooding, but not so high as to cause entrainment of liquids in the distillation column. Distillation column diameter and length will influence the purge gas velocity in the distillation column.

In some embodiments, a hot cyclone is disposed upstream of the distillation column, to remove solid particulates (e.g., dust) from the retorted stream. In these or other embodiments, a ceramic filter is disposed upstream of the distillation column, to remove solid particulates from the retorted stream. The solids may be disposed of as solid sludge waste, or recovered as a co-product.

In some embodiments, the method further comprises generating a purified wax stream from the distillation column in step (c). This purified wax stream may contain microcrystalline waxes with isoparaffinic (branched) hydrocarbons and naphthenic hydrocarbons, for example.

In some embodiments, the method further comprises generating one or more nitrogen-containing streams comprising pyridines, pyrroles, acridines, and/or amines or similar compounds from the distillation column in step (c).

Figure 2:
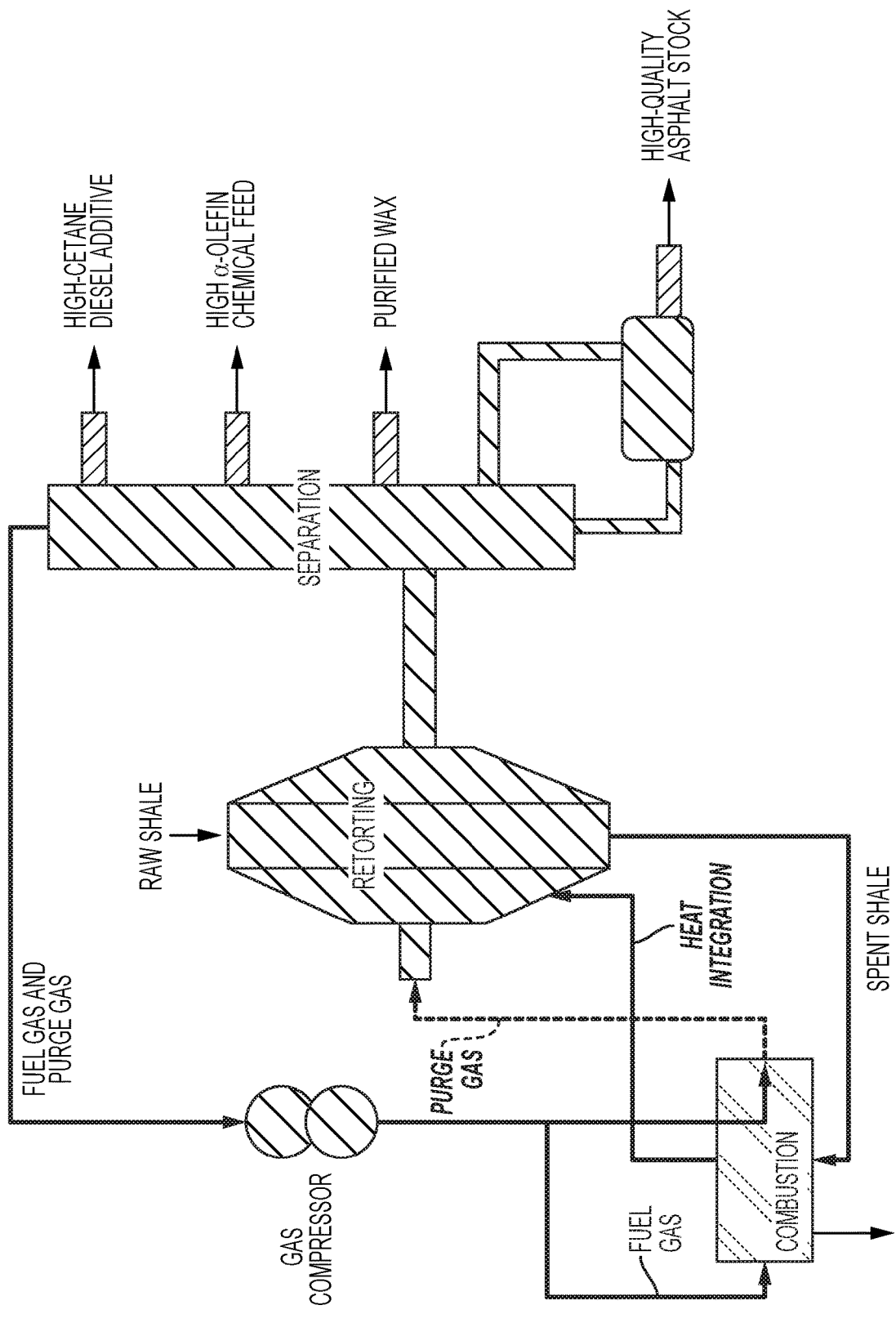
FIG. 2 is a simplified process flow diagram illustrating concepts of the invention, in various embodiments.

FIG. 2 is a simplified process flow diagram illustrating various concepts of the invention, in various embodiments. A relatively thin layer of oil shale is retorted using hot purge gas (at an optimal temperature), wherein the purge gas contains carbon dioxide as a significant component. The oil shale bed may be a vertical stack of oil shale with the raw oil shale added to the top of the stack and spent oil shale being removed from the bottom of the stack.

The hot gases leaving the heated retorting unit contain vaporized SCO. Preferably, step (c) occurs after step (b) with no intermediate cooling, formation of liquids, and/or storage or transport of material. By cooling the vaporized SCO in stages, the SCO can be split into several streams that give much higher value than the mixed SCO stream. In FIG. 2, the stages shown are stages of a single distillation column. It should be recognized that in principle, the stages may be physically separated into multiple columns, flash tanks, or other separation units.

Another possible configuration utilizes a horizontal, rotating drum to agitate the oil shale while hot gas contacts a thin, agitating bed of oil shale. In such case, the oil shale is frequently introduced to one end of the rotating drum while the spent shale is removed from the other end (horizontally) of the rotating drum.

As shown in FIG. 2, the fuel/purge gas from the top of the distillation column is returned to the process, through a compressor, and split into a fuel gas stream to be burned (creating a flue gas) and a purge gas stream to be indirectly heated by the flue gas. The step of separating the overhead gas stream into a fuel gas stream and a purge gas stream may be performed with a simple flow splitter with various splits, such as from about 10%, 20%, 30%, 40%, 50%, 60%, 70%, 80%, or 90% proceeding to the fuel gas stream. The heated purge gas enters the retorting unit, providing heat to it.

Additional heat for the process may be provided by burning the carbon content of the spent oil shale. For example, the spent oil shale may contain approximately 1 wt % to 5 wt % residual carbon. The fuel gas and spent oil shale may be burned at atmospheric pressure in a furnace, for example. Flue gas may be used to indirectly heat the incoming oil shale.

The flue gases will contain contaminants (e.g., $NO_x$, $SO_2$, and arsenic oxides) which may be scrubbed using conventional methods. The fired spent shale will be low in contaminants and may be returned to the mine site for reclamation of the site, or used for other purposes.

In preferred embodiments, the heated retorting unit is operated below an average retorting temperature of about 500° C. The "average retorting temperature" refers to the average, in time and space, within the actual retorting zone itself. Higher temperatures may occur at heat-transfer surfaces (internal or external), or at the retort heat source, for example. The heated retorting unit, especially downstream of the retorting zone, is preferably operated below an average retorting temperature of about 450° C., 400° C., or 350° C. In some embodiments, the oil shale itself is maintained below a temperature of about 500° C., 450° C., 400° C., or 350° C., recognizing that local hot spots may occur within the retorting unit.

Also, in preferred embodiments, the retorted stream comprising vaporized synthetic crude oil is maintained below a temperature of about 500° C., 450° C., 400° C., or 350° C., including within the distillation column and its reboiler section. However, preferably, the retorted stream remains hot to avoid overcooling of the synthetic crude oil which would cause an energy penalty in the distillation column (to heat the material back up for thermodynamic liquid/vapor separation), and to avoid condensation (liquid formation from the hot retorted stream) prior to input into distillation. In some embodiments, between the retorting unit and the distillation column, the retorted stream is maintained above a temperature of about 200° C., 250° C., 300° C., 350° C., or 400° C.

Besides temperature, the heated retorting unit may be operated at a range of residence times, pressures, and flow patterns. Solid-phase retorting residence times may vary, such as from about 1 minute to about 2 hours. Gas-phase retorting residence times are less, such as from about 1 second to about 10 minutes. Preferably, after hydrocarbons are generated from the oil shale, those hydrocarbons (in the gas phase) should not reside in the hot zone for more than a few seconds, to avoid thermal decomposition reactions. The retorting pressure (gas phase) may vary, such as from slightly below 1 atmosphere to about 10 atmospheres.

The hot retort gas containing the desired products (i.e., the retorted stream) will then enter into a distillation column. An option (not shown in FIG. 2) is a hot cyclone or ceramic filter to control dust going to the distillation column.

The distillation column will be similar to both the atmospheric column and vacuum column in a crude oil refinery. The distillation column will act like a vacuum column because the gas stream is diluted with inert gas (primarily $CO_2$ but potentially also $N_2$ and/or other gases), lowering the partial pressures of the products. Hence, good separation of asphalt from paraffins will be practical.

The distillation column may be configured with physical plates (or trays), with distillation packing, or both of these, to provide equilibrium separation stages. One skilled in the art of distillation will be able to readily design the distillation column(s). A sufficient number of stages (physical plates and/or height of packing) is necessary to capture the high-cetane number diesel fraction (i.e., the high-cetane diesel stream). A sufficient number of stages is also necessary to capture the α-olefin fraction (i.e., the α-olefin-containing chemical stream). When a purified wax stream is also desired, a sufficient number of stages is also necessary to capture the purified wax stream. The locations of side draws for the multiple products may vary.

A reboiler section is present at the bottom of the column. The vapors from the reboiler are returned to the distillation column, and the liquid from the reboiler (the bottoms product) is an asphalt/asphalt additive stream. The distillation column optionally includes a top condenser. The overheads product from the condenser is the overhead gas stream, and the liquid from the condenser may be refluxed back to the column and/or collected as the high-cetane diesel fraction or as another product. When a condenser is not included, all of the material leaving the top stage of the column forms the overhead gas stream that is later split into the purge gas and fuel gas.

The overhead gas stream is the most-volatile portion of the incoming hydrocarbon stream and is used as fuel to drive the retorting and the distillation processes. The cut point for the overhead gas stream may be optimized around process fuel needs against the value of lighter hydrocarbons in the local market. That is, more or less hydrocarbon species may be diverted to the overhead gas stream, versus the high-cetane diesel stream or other products. On the other hand, most or all of the $CO_2$ that entered the column leaves in the overhead gas stream.

Figure 3:
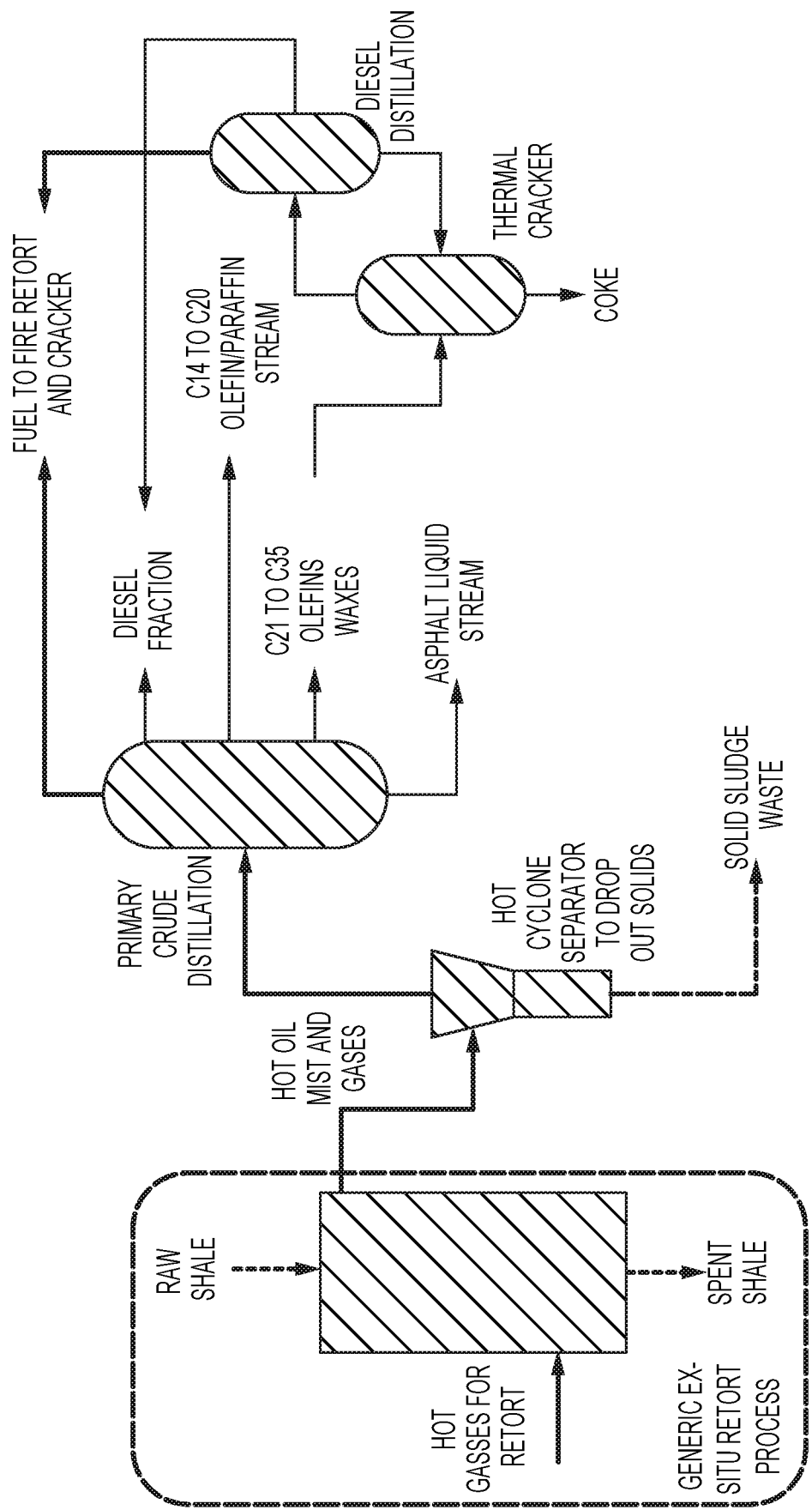
FIG. 3 is a simplified process flow diagram illustrating some embodiments of the invention.

Other recycle loops may be present to optimize cut points in distillation. Additional reboilers, condensers, or other conditioning units may be applied to side draws in the column. Additional distillation columns may be employed for more-refined separations, such as is shown in FIG. 3. Side streams may be treated to remove specific contaminants or to trap specific chemicals.

In some embodiments, one or more chilled collection systems are used to trap light high-value streams and potentially further condensation and re-distillation. Chemical processes may be adapted to remove contaminants (e.g. sulfur, nitrogen, or arsenic) or to capture high-value compounds (e.g. pyridine or other amines, specific α-olefins, specific hydrocarbons, etc.).

Some embodiments include recycling low-value cuts for fuel (in the combustion unit), for cracking in the retorting unit, for treating in a separate reactor, or a combination thereof. Mild hydrogenation or adsorption of contaminants may be employed to upgrade certain cuts dramatically. A chemical adsorption unit may be used to recover amines (e.g., pyridine) in an acid. A chemical or physical adsorption unit may be used to separate olefins from alkanes, such as to enrich the α-olefin content of the α-olefin chemical stream or another stream from distillation. In preferred embodiments, a step of hydrotreating is not employed, thereby minimizing water usage.

FIG. 3 is a simplified process flow diagram that illustrates some of the many modifications that are possible, in various embodiments.

Some variations of the invention provide multiple products from oil shale, the products produced from a process comprising the steps of:

(a) providing raw oil shale containing kerogen;

(b) feeding the raw oil shale into a heated retorting unit, wherein the heated retorting unit converts the kerogen into a retorted stream comprising vaporized synthetic crude oil;

(c) introducing the retorted stream to a distillation column to generate at least a high-cetane diesel stream, an α-olefin-containing chemical stream, an asphalt/asphalt additive stream, and an overhead gas stream, wherein heat contained in the retorted stream is harnessed as distillation energy in the distillation column;

(d) separating the overhead gas stream into a fuel gas stream and a purge gas stream;

(e) combusting at least a portion of the fuel gas stream to generate a hot flue gas;

(f) heating the purge gas with the hot flue gas, to generate heated purge gas;

(g) feeding the heated purge gas directly to the heated retorting unit; and (h) recovering the high-cetane diesel stream, the α-olefin-containing chemical stream, and the asphalt/asphalt additive stream as products.

Many products may be produced according to this disclosure. One is a high-cetane diesel product. Cetane number (or cetane rating) is an indicator of the combustion speed of diesel fuel and compression needed for ignition. Generally, diesel engines operate well with a cetane number of about 50. Diesel fuels with lower cetane number have longer ignition delays, requiring more time for the fuel combustion process to be completed. Hence, higher speed diesel engines operate more effectively with higher cetane number fuels. In some embodiments, the high-cetane diesel product produced herein has a cetane number of at least 50, 55, 60, 65, 70, 75, or higher. The high cetane number means that this product can be sold as a valuable additive for lower-quality (lower cetane number) diesel fuels, i.e., when blended with such fuels, the final diesel number may be in a target cetane number range (e.g., about 45-60). The high-cetane diesel product may be used in place of other cetane enhancers in the market, such as (but not limited to) alkyl nitrates (e.g., 2-ethylhexyl nitrate) and di-tert-butyl peroxide. In certain embodiments, the high-cetane diesel product is usable directly as a diesel fuel.

Another product produced according to this disclosure is an α-olefin-containing chemical product. Alpha-olefins (α-olefins) are a family of organic compounds which are alkenes with a chemical formula $C_xH_{2x}$, distinguished by having a double bond at the primary or α position. This location of a C=C double bond enhances the reactivity of the compound and makes it useful for a number of applications, such as, but by no means limited to, surfactants, synthetic lubricants and drilling fluids. The α-olefins may be linear (e.g., 1-decene) or branched (e.g., isobutylene). The α-olefin-containing chemical product may contain non-olefins, such as alkanes or aromatics. In some embodiments, the α-olefin-containing chemical product contains at least 50 wt %, 60 wt %, 70 wt %, 80 wt %, 90 wt %, or 95 wt % α-olefins. As stated earlier, post-distillation separations may be used to achieve high α-olefin purity, such as 90 wt %, 95 wt %, or 99 wt % (or higher) α-olefin content.

Another product produced according to this disclosure is asphalt and/or an asphalt additive. Asphalt is a sticky, black, and highly viscous liquid or semi-solid form of hydrocarbons. An asphalt additive is a product that may be added to asphalt, such as a low-quality asphalt, to enhance or modify the properties of the initial asphalt material. A major use of asphalt is in road construction, where it is used as the glue or binder mixed with aggregate particles to create asphalt concrete. Another significant use of asphalt is for bituminous waterproofing products. In some embodiments, most or all of the sulfur and nitrogen contained initially in the raw oil shale ends up in the asphalt/asphalt additive product, which can increase quality due to the binding properties of sulfur and nitrogen.

In some embodiments, wax is produced. Wax is a diverse class of organic compounds that are lipophilic, malleable solids near ambient temperatures. Waxes include higher alkanes and lipids, typically with melting points above about 40° C. In some embodiments, paraffin wax is produced. Paraffin waxes are mixtures of saturated n-alkanes and iso-alkanes, naphthenes, and alkyl- and naphthene-substituted aromatic compounds. A typical alkane paraffin wax chemical composition comprises hydrocarbons with the general formula $C_nH_{2n+2}$, such as hentriacontane, $C_{31}H_{64}$. The degree of branching has an important influence on wax properties. Microcrystalline wax contains a higher percentage of isoparaffinic (branched) hydrocarbons and naphthenic hydrocarbons. Waxes are used industrially as components of complex formulations, often for coatings.

Retorting and distillation operations may be adjusted and optimized to respond to market conditions, including geographic and seasonal conditions.

It is also noted that non-fuel products, such as α-olefins, asphalt, and wax, sequester $CO_2$ (i.e. do not produce $CO_2$ by combusting the product) and reduce the overall $CO_2$ footprint—in addition to the $CO_2$ footprint reduction associated with utilizing otherwise wasted retorting heat for distillation.

Other variations of the invention provide a system for producing multiple products from oil shale, the system comprising:

(a) a heated retorting unit configured to convert kerogen-containing raw oil shale into a retorted stream comprising vaporized synthetic crude oil;

(b) a distillation column in flow communication with the heated retorting unit, wherein the distillation column comprises a high-cetane diesel outlet, a high α-olefin-containing chemical outlet, an asphalt/asphalt additive outlet, and an overhead gas outlet;

(c) a gas separation unit in flow communication with the overhead gas outlet, wherein the gas separation unit is configured to separate an overhead gas stream into a fuel gas stream and a purge gas stream;

(d) a combustion unit in flow communication with the fuel gas stream, wherein the combustion unit is configured to combust the fuel gas stream to generate a hot flue gas, and wherein the combustion unit is further configured to heat the purge gas stream to generate heated purge gas; and (e) a gas flow line between the combustion unit and the heated retorting unit, wherein the gas flow line is configured to feed the heated purge gas to the heated retorting unit.

In some embodiments, the heated retorting unit is a vertical retort. In other embodiments, the heated retorting unit is a horizontal retort. Generally speaking, any ex situ retorting unit known in the art may be utilized in this invention.

The combustion unit may be in flow communication with a solid outlet of the heated retorting unit, wherein the combustion unit is further configured to combust spent shale. That is, the same combustion unit is capable of burning both the fuel gas and the spent shale. In alternative embodiments, separation combustion units are used to burn the fuel gas and the spent shale. Note that hydrocarbon and carbon portions of the spent shale are being combusted in these embodiments, not the rock portion itself.

In some embodiments, a hot cyclone and/or ceramic filter is disposed between the heated retorting unit and the distillation column, to remove solid particulates (e.g., dust) from the retorted stream prior to entering the distillation column.

In some systems, the distillation column further comprises a purified wax outlet. In some systems, the distillation column further comprises one or more outlets pyridine, pyrroles, acridines, amines, and/or similar compounds.

The system may further include a thermal cracker in flow communication with the distillation column, such as is shown in FIG. 3. A thermal cracker may be employed to produce a coke co-product, for example.

The system may further include a hydrogenation unit in flow communication with the distillation column. For example, a portion or all of the α-olefin-containing stream may be fed to a hydrogenation unit, under effective hydrogenation conditions with $H_2$ feed, to convert the α-olefins into alkanes.

The system may further include one or more chemical or physical adsorption units in flow communication with the distillation column. Adsorption units may employ membranes, for example, for specific separations of species from streams.

Generally, the retorting and distillation methods and systems herein may be adapted with additional physical and chemical techniques to recover specific products, reduce contaminants in the final products, convert intermediate products into other products, and so on.

The retorting and distillation methods and systems described herein are beneficial in the ability to minimize overall energy usage, water usage, plant size, infrastructure requirements, environmental impacts, and $CO_2$ footprint, among other benefits.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A method for producing multiple products from oil shale, said method comprising:
    (a) providing raw oil shale containing kerogen;
    (b) feeding said raw oil shale into a heated retorting unit, wherein said heated retorting unit converts said kerogen into a retorted stream comprising vaporized synthetic crude oil;
    (c) introducing said retorted stream to a distillation column to generate at least a high-cetane diesel stream, an α-olefin-containing chemical stream, an asphalt/asphalt additive stream, and an overhead gas stream, wherein heat contained in said retorted stream is harnessed as distillation energy in said distillation column;
    (d) separating said overhead gas stream into a fuel gas stream and a purge gas stream;
    (e) combusting at least a portion of said fuel gas stream to generate a hot flue gas;
    (f) heating said purge gas with said hot flue gas, to generate heated purge gas;
    (g) feeding said heated purge gas directly to said heated retorting unit; and
    (h) recovering said high-cetane diesel stream, said α-olefin-containing chemical stream, and said asphalt/asphalt additive stream as products.

2. The method of claim 1, wherein said raw oil shale is Green River Formation oil shale.

3. The method of claim 1, wherein said heated retorting unit is operated below an average retorting temperature of 500° C.

4. The method of claim 1, said method further comprising combusting spent shale from said heated retorting unit, to generate fired spent shale and a portion of said hot flue gas.

5. The method of claim 1, said method further comprising introducing renewable heat to generate said heated purge gas.

6. The method of claim 5, wherein said renewable heat is obtained from solar energy, wind energy, biomass energy, geothermal energy, or a combination thereof.

7. The method of claim 1, wherein said heated purge gas is at a temperature of about 400° C. or greater.

8. The method of claim 7, wherein said heated purge gas is at a temperature of about 500° C. or greater.

9. The method of claim 1, wherein said heated purge gas contains less than 0.1 vol % oxygen.

10. The method of claim 9, wherein said heated purge gas contains less than 0.01 vol % oxygen.

11. The method of claim 1, wherein said heated purge gas contains at least 25 vol % carbon dioxide.

12. The method of claim 11, wherein said heated purge gas contains at least 50 vol % carbon dioxide.

13. The method of claim 1, wherein said retorted stream entering said distillation unit contains at least 25 vol % carbon dioxide.

14. The method of claim 13, wherein said retorted stream entering said distillation unit contains at least 50 vol % carbon dioxide.

15. The method of claim 1, wherein said method further comprises a hot cyclone and/or ceramic filter, and wherein said hot cyclone and/or ceramic filter is disposed upstream of said distillation column, to remove solid particulates from said retorted stream.

16. The method of claim 1, said method further comprising generating a purified wax stream from said distillation column in step (c).

17. The method of claim 1, said method further comprising generating one or more nitrogen-containing streams comprising pyridines, pyrroles, acridines, amines, and/or functional analogues thereof, from said distillation column in step (c).

18. A system for producing multiple products from oil shale, said system comprising:
    (a) a heated retorting unit configured to convert kerogen-containing raw oil shale into a retorted stream comprising vaporized synthetic crude oil;
    (b) a distillation column in flow communication with said heated retorting unit, wherein said distillation column comprises a high-cetane diesel outlet, an α-olefin-containing chemical outlet, an asphalt/asphalt additive outlet, and an overhead gas outlet;
    (c) a gas separation unit in flow communication with said overhead gas outlet, wherein said gas separation unit is configured to separate an overhead gas stream into a fuel gas stream and a purge gas stream;

(d) a combustion unit in flow communication with said fuel gas stream, wherein said combustion unit is configured to combust said fuel gas stream to generate a hot flue gas, and wherein said combustion unit is further configured to heat said purge gas stream to generate heated purge gas; and (e) a gas flow line between said combustion unit and said heated retorting unit, wherein said gas flow line is configured to feed said heated purge gas to said heated retorting unit.

19. The system of claim 18, wherein said heated retorting unit is a vertical retort.

20. The system of claim 18, wherein said heated retorting unit is a horizontal retort.

21. The system of claim 18, wherein said combustion unit is in flow communication with a solid outlet of said heated retorting unit, and wherein said combustion unit is further configured to combust spent shale.

22. The system of claim 18, wherein a hot cyclone and/or ceramic filter is disposed between said heated retorting unit and said distillation column.

23. The system of claim 18, said distillation column further comprising a purified wax outlet.

24. The system of claim 18, said distillation column further comprising an outlet for pyridine, pyrroles, acridines, amines, and/or functional analogues thereof.

25. The system of claim 18, said system further comprising a thermal cracker in flow communication with said distillation column.

26. The system of claim 18, said system further comprising a hydrogenation unit in flow communication with said distillation column.

27. The system of claim 18, said system further comprising one or more chemical or physical adsorption units in flow communication with said distillation column.

* * * * *